UNITED STATES PATENT OFFICE.

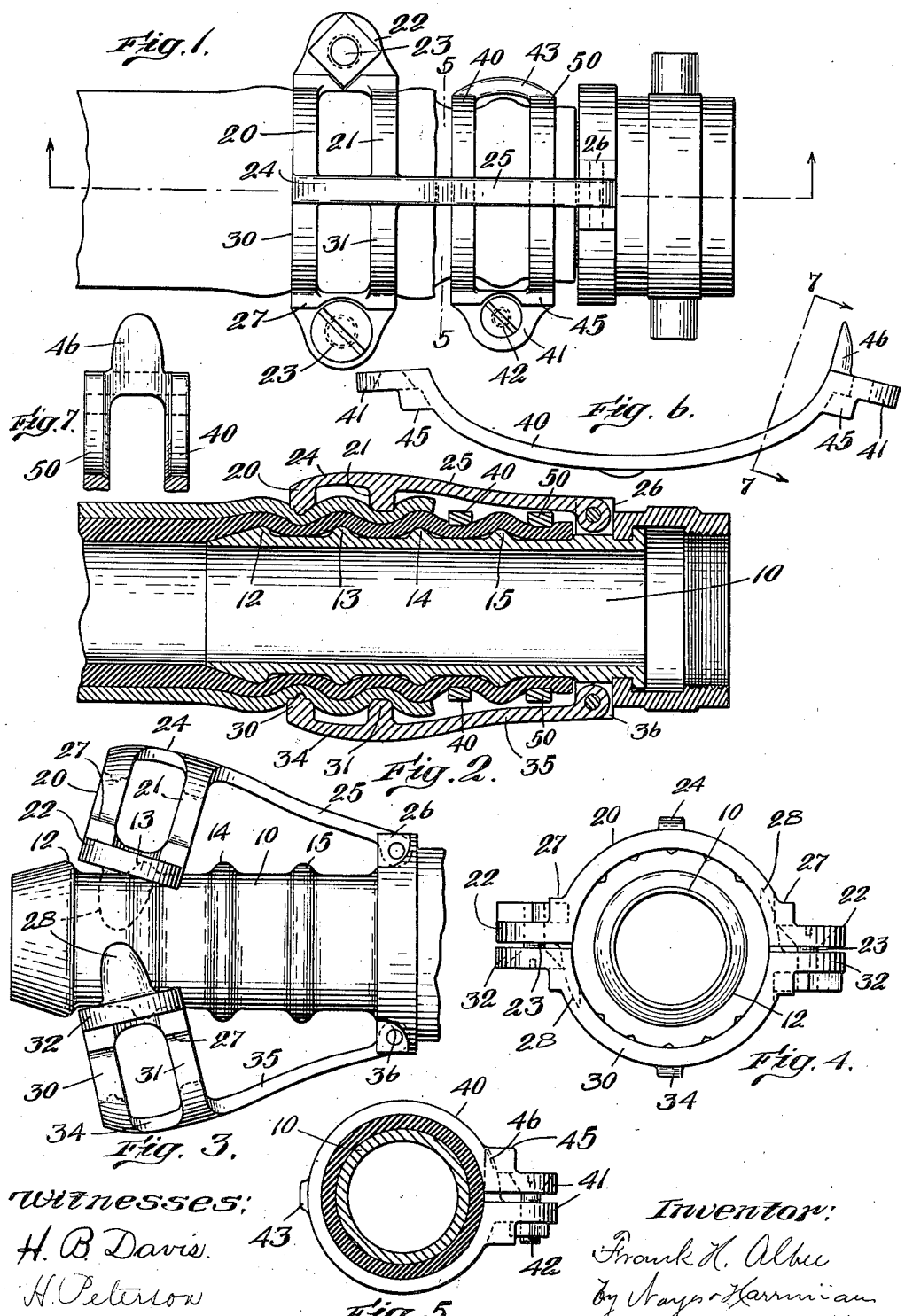

FRANK H. ALBEE, OF BOSTON, MASSACHUSETTS.

HOSE-CLAMP.

1,072,896.        Specification of Letters Patent.        Patented Sept. 9, 1913.

Application filed April 2, 1913. Serial No. 758,303.

*To all whom it may concern:*

Be it known that I, FRANK H. ALBEE, a citizen of the United States, residing at Boston, State of Massachusetts, have invented an Improvement in Hose-Clamps, of which the following is a specification.

Spraying apparatus for use at the present time in spraying trees in outlying districts is usually equipped with a long line of hose which may be run into the woods sometimes approximately 1000 feet, and a horse is usually used to haul the same into and about the woods on account of the great weight of the hose, particularly when it is filled with a spraying solution, as for instance, a solution of arsenate of lead. As the hose is hauled about from place to place, the strain on the hose and the couplings and the attaching-means for the hose with the couplings is exceedingly great, in fact, too great to be withstood by ordinary hose, and ordinary hose-couplings, and ordinary attaching-means. One of the weakest places in the line is the point of attachment of the hose with the coupling, for even when the coupling is made strong enough and the hose itself is strong enough, yet it is liable to become detached from the coupling. The hose which is employed at the present time but which is especially devised for this purpose, is composed of layers of rubber and canvas incorporated together and has an outside knit or woven jacket of some strong textile material, and is practically non-extensible and is quite well suited for the purpose.

When the attaching-means for attaching the end of the hose to the coupling engages the jacketed end of the hose the strain is brought directly upon the jacket, and, as said jacket is itself not incorporated in or embedded in the material composing the inner tubular part of the hose such method of attaching the end of the hose is not sufficient to stand the strain put upon it.

One of the objects of this invention is the construction of an improved and very strong form of attaching-means which comprises two or more hose-engaging elements of two different diameters, one of said engaging elements engaging a jacketed part of the hose and another engaging element engaging an unjacketed part of the hose, thus obtaining a firm grip on both the inner and the outer parts of the hose by means which are not movable relatively to each other.

Another object of the invention is the construction of the coupling with a nipple having thereon a plurality of annular beads and attaching-means comprising hose-engaging elements consisting of bars arranged opposite the spaces between the beads to engage the hose at such points and thereby impinge it sufficiently to cause it to enter said spaces between the beads, but to compress it therein. These bars may be made of such length as to require two to entirely encircle the hose or they may be made of such length that each bar will entirely encircle the hose. To assist in correctly locating these bars with respect to the spaces between the beads they are arranged on an arm which is hinged to the nipple, and if two or more bars are employed, arranged opposite two or more spaces, they will or may be joined together at suitable points to maintain parallel relation with each other, care being taken, however, to provide an open space of ample width between them throughout their length, so that they will not engage that portion of the hose which extends over the beads. The bars will be made of metal sufficiently ductile to withstand bending, so that they may be bent by a hammer or other tool to obtain a firm gripping contact with the entire contour of the hose which they engage. Additional independent bars may be employed, as many as desired, which may be joined together at suitable points, so as to maintain parallel relation with each other, said bars being made of ductile material adapting them to be bent to correctly conform to the contour of the hose and to engage the same firmly at all points throughout their length.

Figure 1 is a front elevation of an attaching-means for hose, with a half hose-coupling, embodying this invention. Fig. 2 is a longitudinal vertical section of the same. Fig. 3 is a side elevation of a coupling nipple and one of the hose-engaging elements shown in Fig. 1. Fig. 4 is an end view of the coupling-nipple and hose-engaging element of Fig. 3. Fig. 5 is a transverse vertical section of the hose and coupling-nipple taken on the dotted line 5—5, Fig. 1. Fig. 6 is a side elevation of one of the hose-engaging elements. Fig. 7 is a transverse vertical section of same, taken on the dotted line 7—7, Fig. 6.

10 represents one of the nipples of a hose-coupling. It has arranged on it a plurality of annular beads, here shown as four in number, as 12, 13, 14 and 15, although any other number may be employed. Said beads preferably have convex surfaces, so as not to cut the material of the hose when the nipple is thrust into the open end thereof, and subsequently when the hose is compressed in the space between them, for it will be understood that the diameter of the way through the nipple is substantially the same as the diameter of the way through the hose, and as the nipple is thrust into the open end of the hose, the hose is interiorly expanded when passing over the beads.

The particular form of hose herein employed is especially constructed to withstand severe strains longitudinally as well as diametrically, and hence is practically nonextensible, and considerable power is required to thrust the nipple into its open end, notwithstanding its interior rubber lining is compressible. This result, however, may be accomplished by a suitable machine which has been designed for the purpose. When the nipple has been thrust into the open end of the hose those portions of the interior rubber lining which extend over the beads on the nipple are compressed to their safe limit, and further compression would act to injure the lining and thereby weaken the hose.

The nipple has associated with it a plurality of hose-engaging bars arranged to engage the exterior of the hose opposite the spaces between the beads, and to compress the hose severely in said spaces, thereby to obtain a firm grip on the hose at such points, and hold it in firm engagement with the nipple. Some of the bars here shown extend half-way around the hose and others extend entirely around the hose. Referring first to those bars which extend half-way around the hose, 20, 21 and 30, 31, represent four of said bars, each made semicircular, with or without spurs on its hose-engaging face, and said bars 20, 30, are arranged to occupy a position opposite the space between the beads 12, 13 and said bars 21, 31 are arranged to occupy a position opposite the space between the beads 13 and 14. In order that said bars may be located correctly with respect to said spaces and maintained in parallel relation they are joined together at their ends by bridges having ears 22, 32, which are formed or provided at such points, which ears extend outwardly and are perforated to receive bolts 23, for connecting the ears 22 with the ears 32, thereby to draw the bars 20 and 21 toward the bars 30 and 31, and cause them to firmly impinge the hose and compress it. One or more bridges 24, 34, may also connect the bars of each pair together, which may be located at any desired point or points, said bridges being extended outwardly or arched to prevent them from coming in contact with the hose, as it is understood that said bridges extend over the hose at those portions thereof which extend over the beads, and it is important that no pressure whatsoever shall be exerted on the hose at such points, and in this particular it may be stated that the bars are widely spaced apart, the width of the spaces being much greater than the width of the beads and that the full effect of such wide spaces is utilized. Furthermore, in correctly locating the bars with respect to the spaces they are connected to arms 25, 35, which extend along the sides of the nipple and are pivotally connected to ears 26, 36, formed on the base portion of the nipple.

The idea of hingedly connecting the hose-engaging members with the nipple itself is old in the art, but so far as I am aware two parallelly arranged semicircular bars, widely spaced apart and joined together at their ends and preferably at one or more intermediate points therebetween, said bars being arranged opposite the spaces between the beads on the nipple and adapted to exert a pressure on the hose at such points only, and throughout their entire length, leaving those portions of the hose which extend over the beads absolutely free, is novel. Said bars are made of quite stiff yet ductile material, so that they may be bent by striking them a blow with the hammer or some similar tool, and, as here shown, each bar has a shoulder 27 at each end adjoining the ear, which is adapted to be struck by a hammer, thus to bend it and force it into firm engagement with the hose, although the bolts 23 will also act to bend said bars. Each pair of bars is provided at one end with a curved lip 28, which is made approximately as wide as the space between the bars, but no wider, said lips being adapted to enter the spaces between the bars of the other pair and cross the joint at the meeting points of the bars, but as said lip is only made as wide as the space between the bars said bars are free to engage the hose throughout their entire length which is very important.

In addition to the aforesaid hose-engaging bars other hose-engaging bars which extend entirely around the hose are employed and, as here shown, two such hose-engaging bars are provided, represented at 40, 50, which are arranged in parallel relation and joined together at their ends by bridges which are arched and provided with outwardly extended ears 41, which are perforated to receive bolts 42 by which said ears are drawn together and secured. Said bars are or may be connected together at one or more points intermediate their length by bridges 43. These bars are also widely spaced apart, so that when engaging the hose opposite the spaces between the beads 14 and 15, and the bead 15 and the base of the nipple, those portions of the hose which extend over said beads will not be engaged. These bars when drawn into engagement with the hose not only firmly engage the hose throughout the length but also compress it. These bars are also made of ductile material and adapted to be bent to conform to the contour of the hose, and are provided with shoulders 45 at their ends adjoining the ears adapted to receive blows of a hammer or other tool for bending the bars. A longitudinally curved lip 46, grooved transversely in its under side, is also provided at one end of said bars adjoining the ear thereat which is made of a width corresponding to the space between the bars is adapted to enter the space between the bars at the other end thereof and to cross the meeting point of said ends when in engagement with the hose. Said additional hose-engaging bars are arranged beneath the arms 25, 35, but are or may be free from engagement with said arms.

The hose-engaging means thus described involves two elements, one comprising the semicircular bars pivotally supported on the nipple which coöperate to embrace the hose, and the other comprising a single pair of bars which entirely embrace the hose, and these two elements are purposely made separate and of different diameter, so that one of the elements may engage a jacketed portion of the hose and the other element may engage an unjacketed portion of the hose.

As shown in Fig. 1, the end portion of the hose-jacket is removed at the end of the hose, exposing the inner part of the hose with which said jacket is not incorporated or embedded in the process of manufacture, and the hose-engaging element comprising the semicircular bars is made of larger diameter than the other hose-engaging element, thereby to engage the jacketed portion of the hose, while the hose-engaging element of smaller diameter engages the unjacketed portion of the hose, so that both portions of the hose are separately engaged and securely held. This method of engaging the hose is of particular advantage when the hose is subjected to a severe longitudinal strain, as both the jacketed and the unjacketed portions thereof are separately engaged and securely held.

I claim:—

1. The herein described means for attaching hose to a coupling-nipple consisting of a nipple having a plurality of annular beads with relatively wide spaces therebetween, two pairs of semi-circular bars which are narrower than said spaces and separated to an extent greater than the width of the beads, the bars of each pair being arranged in parallel relation for engagement with the hose opposite the spaces between the beads, means arranged remote from the hose and free from engagement therewith which join said bars together, and means to draw said pairs of bars toward each other to firmly grip the hose opposite said spaces and substantially compress it in said spaces.

2. The herein described means for attaching hose to a coupling-nipple consisting of a nipple having a plurality of annular beads with relatively wide spaces therebetween, two pairs of semi-circular bars which are narrower than said spaces and separated to an extent greater than the width of the beads, the bars of each pair being arranged in parallel relation for engagement with the hose opposite said spaces between the beads, bridges arranged remote from the hose and free from engagement therewith connecting said bars together, and means to draw said pairs of bars toward each other to firmly grip the hose and compress it in said spaces.

3. The herein described means for attaching hose to a coupling-nipple consisting of a nipple having a plurality of annular beads with spaces therebetween, two pairs of semi-circular bars, the bars of each pair being arranged in parallel relation for engagement with the hose opposite said spaces, bridges arranged at both ends of each pair of bars to join said bars together, said bridges being arched substantially the width of the spaces between said bars, so as to be free from engagement with the hose, ears projecting outwardly from said bridges, a curved lip arranged at one end of each pair of bars which is made substantially as wide as the space between said bars, admitting of the bars engaging the hose throughout their entire length opposite said spaces between the beads, said lips crossing the meeting points of the ears, and means to draw said pairs of bars toward each other.

4. The herein described means for attaching hose to a coupling-nipple consisting of a nipple having a plurality of annular beads with spaces therebetween, two pairs of semi-circular bars, the bars of each pair being arranged in parallel relation for engagement with the hose opposite said spaces, bridges arranged intermediate the length of each pair of bars and also at both ends of each pair of bars to join said bars together, said bridges being arched substantially the width of the spaces between said bars, so as to be free from engagement with the hose, ears projecting outwardly from said bridges, a curved lip arranged at one end of each pair of bars which is made substantially as wide as the space between said bars, admitting of the bars engaging the hose throughout their entire length opposite said spaces between the beads, said lips crossing the meeting points of the ears, and means to draw said pairs of bars toward each other.

5. The herein described means for attaching hose to a coupling-nipple consisting of a nipple having a plurality of annular beads with relatively wide spaces therebetween, means to engage a jacketed portion of the hose opposite the spaces between the beads which do not engage the hose over the beads, and two rings which are narrower than the spaces between the beads and separated to an extent greater than the width of the beads and arranged in parallel relation for engaging an unjacketed portion of the hose opposite the said spaces, means arranged remote from the unjacketed portion of the hose and free from engagement therewith for joining said rings together, and means free from engagement with the unjacketed portion of the hose for drawing said rings to cause them to firmly engage said unjacketed portion of the hose and substantially compress it in said spaces, substantially as described.

6. The herein described means for attaching hose to a coupling-nipple consisting of a nipple having a plurality of annular beads with relatively wide spaces therebetween, a pair of bars adapted to entirely embrace the hose, said bars being narrower than said spaces and arranged in parallel relation at a distance apart greater than the width of the beads for engagement throughout their length with the hose opposite the spaces between the beads and bridges having perforated ears arranged at both ends of said bars which join said bar together, said bridges being free from engagement with the hose, substantially as described.

7. The herein described means for attaching hose to a coupling-nipple consisting of a nipple having a plurality of annular beads with relatively wide spaces therebetween, a pair of bars adapted to entirely embrace the hose, said bars being narrower than said spaces and arranged in parallel relation at a distance apart greater than the width of the beads for engagement throughout their length with the hose opposite the spaces between the beads and bridges having perforated ears arranged at both ends of said bars which join said bar together, and arched bridges joining said bars intermediate their length, all said bridges being free from engagement with the hose, substantially as described.

In testimony whereof, I have signed my name to this specification, in the presence of two subscribing witnesses.

FRANK H. ALBEE.

Witnesses:
  B. J. Noyes,
  H. B. Davis.